Sept. 8, 1936.  J. C. VINCENT  2,053,854
MOTOR VEHICLE
Filed Nov. 28, 1933  3 Sheets-Sheet 2
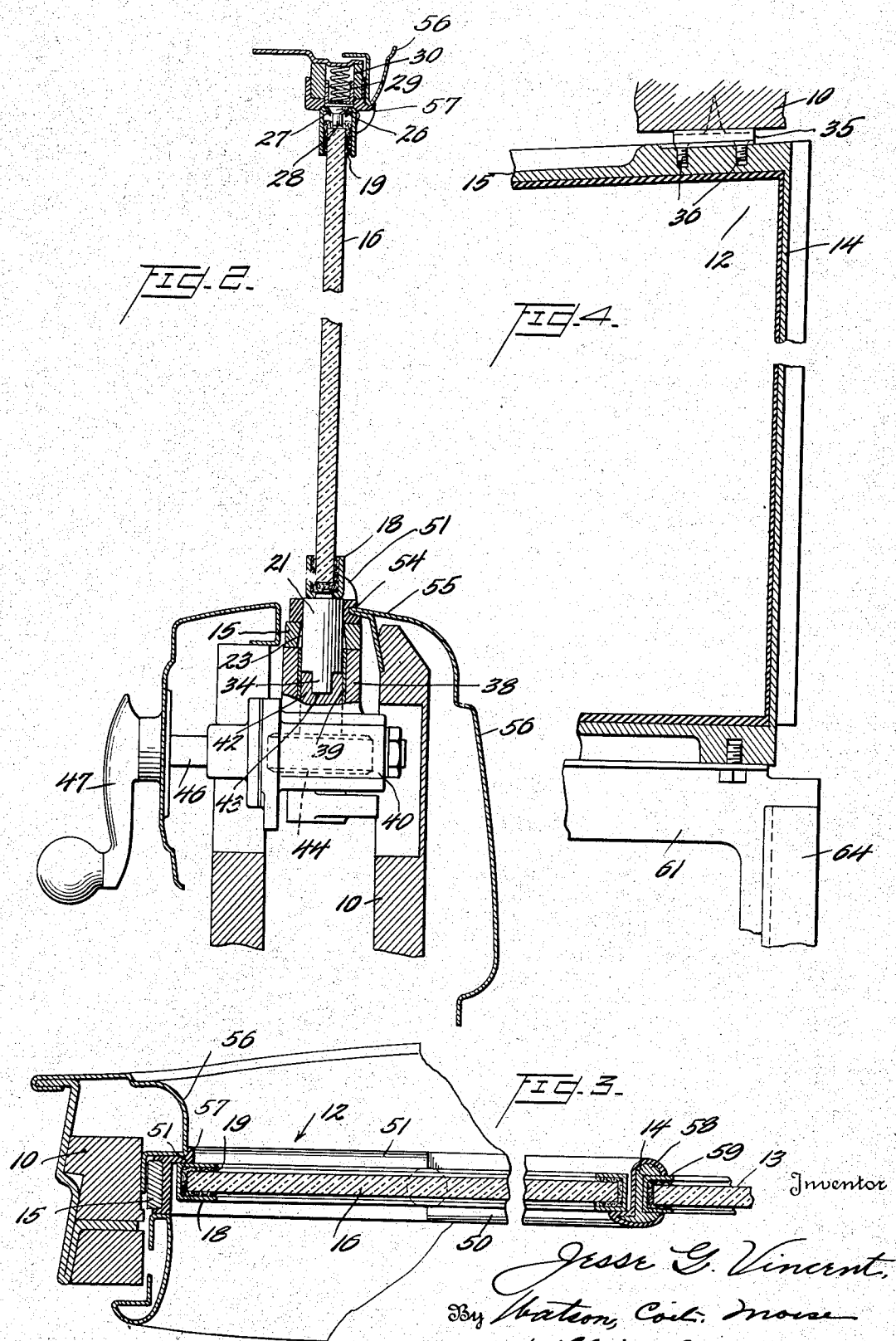
Inventor
Jesse G. Vincent
By Watson, Coit, Morse & Grindle
Attorney Sept. 8, 1936.　　　　　J. G. VINCENT　　　　　2,053,854

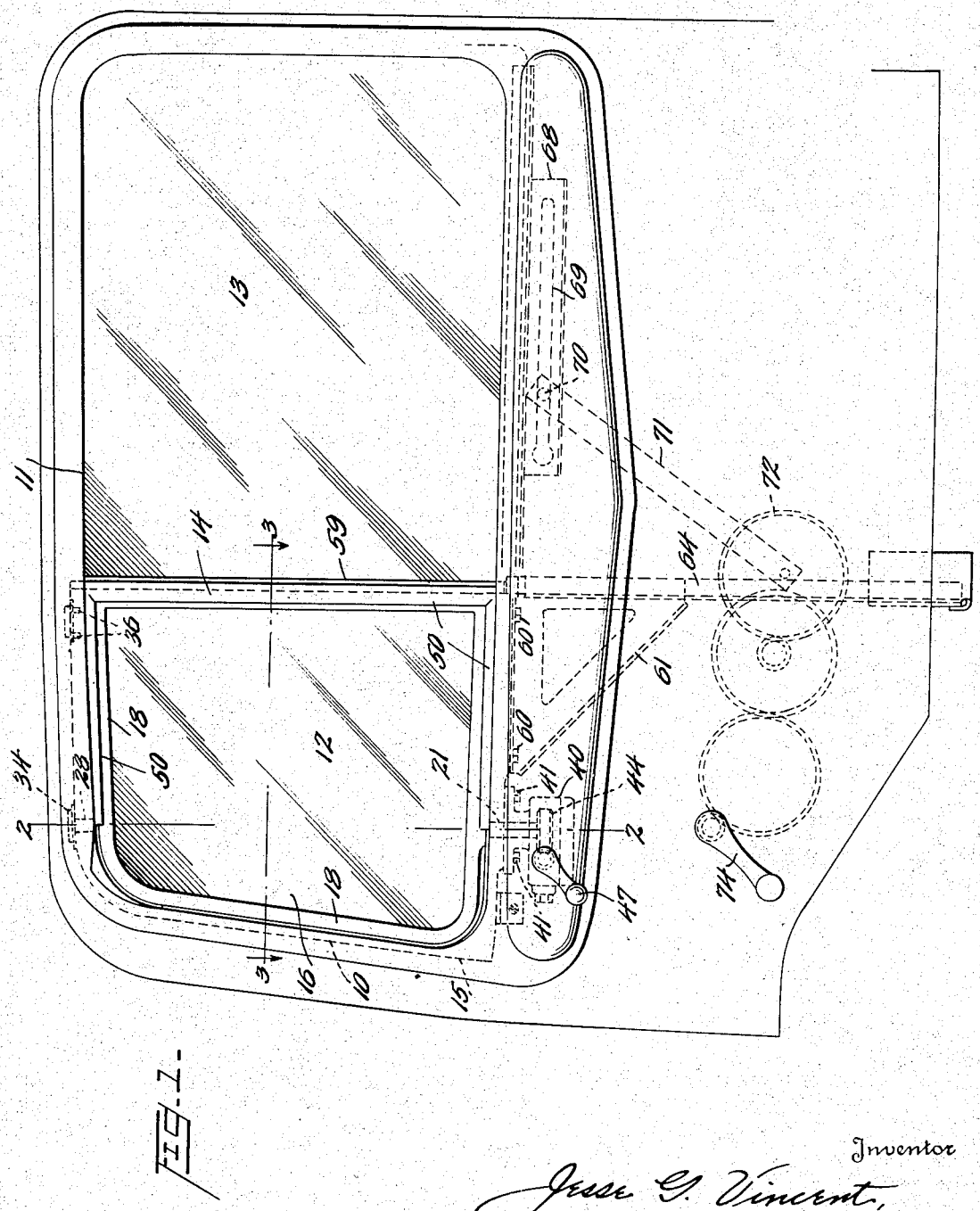

MOTOR VEHICLE

Filed Nov. 28, 1933　　　　3 Sheets-Sheet 3

Patented Sept. 8, 1936

2,053,854

UNITED STATES PATENT OFFICE 2,053,854

MOTOR VEHICLE

Jesse G. Vincent, Grosse Pointe Park, Mich., assignor to Packard Motor Car Company, Detroit, Mich., a corporation of Michigan Application November 28, 1933, Serial No. 700,137

15 Claims. (Cl. 296—44)

This invention relates to improvements in motor vehicle bodies and more particularly to an improved window structure for motor vehicles. It is the principal object of the invention to provide a structure of this character which will ensure proper ventilation of the interior of the vehicle under varying weather conditions and the complete exclusion of rain and wind when desired. The invention contemplates a construction which is rigid and sturdy, the component parts of which are not likely to become loose and to rattle after long use.

More specifically, the invention relates to that type of window construction which involves the provision in a single paneled structure, for instance a vehicle door, of separate independently movable windows, the forward window being supported for pivotal movement about a substantially vertical axis into and out of the plane of the window opening and the rearward window being supported for sliding movement in a generally vertical plane. Experience has shown that it is difficult to maintain proper sealing of the pivoted pane in this type of window owing to warping and loosening of the various elements of the frame in which the window is assembled, and it is therefore proposed to employ an integral rigid frame member serving both to define the opening which the pivoted window closes and to support the pivoted window, and as a guide for the rearwardly disposed sliding pane. In the preferred form of the invention this rigid frame member is provided with sealing means comprising rubber or the like molded thereto and engaging the pivoted window in the closed position of the latter to completely exclude air and moisture from the interior of the vehicle.

It is a further feature of the invention that the molded rubber sealing element of the integral frame cooperates with the usual metal panel of the body member to exclude moisture which might enter the interior of the body member otherwise than through the window openings.

Further objects and features of the invention will be apparent from the following description taken in connection with the accompanying drawings, in which Figure 1 is a side elevation as viewed from the interior of a portion of a vehicle body illustrating the manner in which the invention may be applied thereto;

Figure 2 is a vertical section on the line 2—2 of Figure 1;

Figure 3 is a horizontal section on the line 3—3 of Figure 1;

Figure 4 is a vertical section taken substantially in the plane of the window opening;

Figure 5 is a perspective view of the integral frame member; and

Figure 6 is a fragmentary enlarged section of a portion of the construction illustrated in Figure 2.

It will be observed that the invention has been shown as applied to the conventional forward door of a motor vehicle but it will be appreciated that the same construction may be used in the rear body portion of that type of vehicle employing no doors in the rear section. It will also be understood that while the windows are shown as provided with the usual metal sash or marginal enclosure, this is not an essential feature of the invention, and the term window as used hereinafter is intended to describe the conventional transparent pane whether provided with a marginal frame or not.

Various other changes in the construction illustrated in the drawings may be made without departing from the invention, detailed descriptive language being employed hereinafter in order to facilitate an understanding of the invention and without intent to unnecessarily limit the scope thereof.

Figure 1 of the drawings discloses the usual paneled body structure serving as a door, it being understood that this structure is hinged in the usual manner to a vehicle body pillar, not shown, and comprises a structural frame 10, of which the major portion is wood, and is formed to provide a substantially rectangular window opening 11.

This window opening is divided into a forward portion 12 and a rearward portion 13 by means of a substantially vertical member 14, the member 14 forming the rear side of a rectangular frame 15, shown more particularly in Figure 5 of the drawings.

The frame 15 is integrally formed, preferably of metal; for instance it may be a die casting of aluminum or bronze. The forward window 16 is supported entirely by and within this unitary metal frame 15, and by reason of the rigidity of the frame the window will seat properly within the frame even after long continued use.

Various methods may be employed to support the window 16 in the frame 15. In the preferred embodiment of the invention the window is provided with the usual marginal casing 18 of metal with a layer of felt 19 interposed between the casing and the glass pane, and a downwardly projecting stud 21 is secured to the lower part of the casing 18, this stud passing through an aperture 23 in the frame 15 and being provided at its lower end with a tongue 34 for a purpose hereinafter described. On its upper side the casing 18 of the window 16 is deformed and apertured as at 27 to provide a substantially spherical seat receiving the corresponding spherical portion 26 of a downwardly directed stud 28 carried by the frame 15. The stud 28 is formed with an upwardly directed cup-shaped portion 29 which is slidably received within an aperture 30 in the upper side of the frame 15 and a coil spring 32 is seated in this cup-shaped portion 29 and abuts at its upper end against a plate 34 which is bolted or otherwise secured to the frame 15 as indicated at 31. It will thus be observed that the stud 28 is yieldingly urged in a downward direction to facilitate assembly of the window and to eliminate any play between the points of pivotal support. Thus in assembling the window 16 in the frame 15, the stud 21 is first introduced through the aperture 23 in the lower side of the frame 15 and the stud 28 is displaced upwardly and again released after the upper portion of the window 16 has been swung into position in the plane of the frame. The aperture 30 may be filled with lubricant to ensure proper sliding movement of the stud 28 so that the spring 32 may continue to urge the spherical portion 26 of the stud 28 into engagement with the corresponding seat 27 carried by the window 16.

The frame 15 fits snugly within the usual structure defining the window opening adjacent the forward end of the latter and is secured rigidly in position therein, for instance by means of screws passing through the plate 34 and into the wooden portion of the body structure. A similar plate 35 may be secured as at 36 to the upper side of the frame toward the rear thereof and similarly fastened to the surrounding wooden body structure, and the frame 15 may be anchored to this structure at various other points.

Referring again to the lower stud 21 which forms a pivotal point of support for the window 15, it will be observed that this stud is rotatable within a bushing 39 inserted in an aperture in the upwardly directed boss 38, the latter being formed on a gear housing 40. This gear housing contains conventional worm gearing for rotating the stud 21 and consequently the window 16, comprising a shaft 42 having a recess 43 therein to receive the tongue 24 on the stud 21, the shaft 42 carrying a worm gear 44 which is operatively engaged by a worm, not shown, the latter being carried by a shaft 46 which is provided with the usual operating handle 47 accessible from the interior of the vehicle. The gear housing 40 may be securely bolted to the frame 15 as indicated at 41 to prevent misalignment of the operating mechanism enclosed within the housing 40, the window 16, and the frame 15.

As suggested hereinbefore, the frame 15 is preferably provided with means for sealing the window 16 when the latter is swung into the plane of the frame, this sealing means comprising a layer of rubber which is molded about all of the external faces of the frame 15 and which is formed to provide inwardly directed lip portions 50 and 51, the lip portion 50 extending about the rearward portion of the frame 15 and engaging the inner face of the window 16 adjacent the periphery of the latter and the lip portion 51 being disposed about the forward portion of the frame 15 and engaging the outer face of the window 16 about the peripheral portion thereof. It will be observed that in this manner when the window is swung into the plane of the frame, the entry of air and moisture to the interior of the car is effectively prevented. It will also be observed that because of the rigid nature of the metal frame 15 this sealing will be maintained during the life of the vehicle, warping or loosening of vehicle body members having no effect on the window construction.

Referring more particularly to Figures 2 and 5 of the drawings, it will be observed that the rubber molded on the frame 15 is shaped to provide an outwardly directed groove 54 across the lower portion of the frame, this groove being adapted to receive the upper inwardly directed portion 55 of the usual outer metal panel 56 of the paneled body structure. Furthermore, the upper wall of this groove forms a portion of an outwardly directed lip member 57 which extends about three sides of the metal frame 15 as shown in Figures 2, 3, and 5, this lip member intimately engaging the outer metal panel 56 to effect complete sealing between the frame and the paneled body structure. The entry of water into the interior of this structure is thus prevented.

Referring again to the member 14 which forms the rearward side of the frame 15, this member is formed on its rear edge to provide a channeled portion 58 which receives the peripheral casing or marginal enclosure 59 forming a part of the window 13. The window 13 in its vertical sliding movement is thus properly guided by the member 14.

Secured to the lower side of the frame 15 as at 60 is a substantially triangular bracket 61, and a conventional guide member 64 of channel cross-section similar to that provided by the channeled portion 58 of the member 14 and aligned with the latter is welded or otherwise rigidly secured to the rearward side of the triangular bracket 61. Thus the guiding means for the window 11 is continued downwardly into the paneled body, this guiding means being formed in part integrally with the frame 15 and in part rigidly carried thereby so that smooth operation of the window 11 in its vertical movement is ensured.

It will be understood that conventional guides for the window 11 are also positioned to cooperate with the rearward edge of the window and the usual operating means for the window is provided. This operating means may consist for instance of a bracket 68 carried by the window 11 and having a slot 69 therein in which a pin 70 carried by an arm 71 is adapted to operate, the arm 71 being secured to and rotatable with a gear 72 which is one of a train operable by the usual handle 74, the latter being accessible from the interior of the vehicle.

It will be evident from the foregoing description that various changes may be made in the construction illustrated if desired. Thus the nature of the operating mechanism for either of the windows may differ materially from that illustrated and the operating mechanism for the pivoted window may be entirely eliminated. The points of pivotal support of the swinging window may be moved forwardly or rearwardly from the position shown in the drawings to vary the circulatory effect and under some circumstances the sliding window may be dispensed with altogether, for instance when the invention is applied to the small windows frequently found at the rear of larger vehicles.

Having thus described the invention, what is claimed as new and desired to be secured by Letters Patent is:

1. In a motor vehicle body, the combination with a paneled structure having a substantially rectagular window opening therein, of an integral metal frame of substantially rectangular shape and having a width measured longitudinally of the body less than the width of said opening, said metal frame being rigidly secured in said opening at the forward end of the latter to divide the opening into a rearward portion and a frame enclosed forward portion, a window supported for sliding movement in the rearward portion of said opening, guide means for said window carried by said frame, and a second window pivoted in said frame for swinging movement about a substantially vertical axis into and out of the plane of the frame.

2. In a motor vehicle body, the combination with a paneled structure having a substantially rectangular window opening therein, of an integral metal frame of substantially rectangular shape and having a width measured longitudinally of the body less than the width of said opening, said metal frame being rigidly secured in said opening at the forward end of the latter to divide the opening into a rearward portion and a frame enclosed forward portion, a window supported for sliding movement in the rearward portion of said opening, guide means for said window carried by said frame, a second window pivoted in said frame for swinging movement about a substantially vertical axis into and out of the plane of the frame, and a sealing element comprising rubber molded to said frame having lip portions directed inwardly of the frame and engaging the second window about substantially the entire periphery of the latter in the closed position of the latter.

3. In a motor vehicle body, the combination with a door structure, of a substantially rectangular metal frame rigidly supported by said door structure and defining a window opening, a window pivotally supported in said frame for movement about a substantially vertical axis into and out of the plane of said frame, and operating means connected with said window at the axis thereof for swinging said window, said operating means being carried by said frame.

4. In a motor vehicle body, the combination with a door structure, of a substantially rectangular metal frame rigidly supported by said door structure and defining a window opening, a window pivotally supported in said frame for movement about a substantially vertical axis into and out of the plane of said frame, and operating means for swinging said window, said operating means comprising toothed gearing, and a housing for said gearing carried by said frame.

5. In a motor vehicle body, the combination with a paneled structure, of an open integral metal frame defining a window opening and rigidly secured in said paneled structure, a window, means carried by said frame and engaging said window to support the latter for swinging movement into and out of said frame about a substantially vertical axis, said means comprising upper and lower pivotal supports, and means for yieldingly urging one of said supports toward the other to eliminate play therebetween.

6. In a motor vehicle body, the combination with a paneled structure, of an open integral metal frame defining said window opening and rigidly secured in said paneled structure, a window, means carried by said frame and engaging said window to support the latter for swinging movement into and out of said frame about a substantially vertical axis, said means including an upper and a lower support, a gear housing formed integrally with the lower support, and operating toothed gearing for said window disposed within said gear housing.

7. In a motor vehicle body, the combination with a paneled structure, of an open integral metal frame defining a window opening and rigidly secured in said paneled structure, a window, means carried by said frame and engaging said window to support the latter for swinging movement into and out of said frame about a substantially vertical axis, said means including an upper support yieldingly urged into engagement with said window, and a lower support comprising a housing carried by said frame, and operating means for said window within said housing.

8. In a motor vehicle body, the combination with a paneled structure, of an open integral metal frame defining a window opening and rigidly secured in said paneled structure, a window, means carried by said frame and engaging said window to support the latter for swinging movement into and out of said frame about a substantially vertical axis, a layer of rubber molded to said frame and having inwardly directed portions engaging said window about the major peripheral portion thereof when said window is swung into the plane of said frame, and operating means for said window carried by said frame.

9. In a motor vehicle body, the combination with a paneled structure comprising an outwardly facing metal panel, of an open metal frame defining a window opening and rigidly secured in said paneled structure, a window, means carried by said frame and engaging said window to support the latter for swinging movement into and out of said frame about a substantially vertical axis, and sealing means comprising rubber molded to said frame and engaging said metal panel about the major portion of said window opening to exclude moisture from said paneled structure.

10. In a motor vehicle body, the combination with a paneled structure comprising an outwardly facing metal panel, of an open metal frame defining a window opening and rigidly secured in said paneled structure, a window, means carried by said frame and engaging said window to support the latter for swinging movement into and out of said frame about a substantially vertical axis, and sealing means comprising rubber molded to said frame and engaging said metal panel about the major portion of said window opening to exclude moisture from said paneled structure, said sealing means also engaging said window when the latter is swung into the plane of the frame.

11. In a motor vehicle body, the combination with a paneled structure of an open integral metal frame defining a window opening and rigidly secured in said paneled structure, a window, means carried by said frame and engaging said window to support the latter for swinging movement into and out of said frame about a substantially vertical axis, and a layer of rubber molded to said frame and having inwardly directed portions engaging said window about the major peripheral portion thereof when said window is swung into the plane of said frame, said layer of rubber having outwardly directed portions engaging the outer face of said paneled structure to seal the latter.

12. In a motor vehicle body, the combination with a paneled structure having a substantially rectangular window opening therein, of an integral metal frame of substantially rectangular shape and having a width measured longitudinally of the body less than the width of said opening, said metal frame being rigidly secured in said opening at the forward end of the latter to divide the opening into a rearward portion and a frame enclosed forward portion, a window supported for sliding movement in the rearward portion of said opening, the rearward portion of said frame being formed to provide guide means for said window, and a second window pivoted in said frame for swinging movement about a substantially vertical axis into and out of the plane of the frame.

13. In a motor vehicle body, the combination with a paneled structure having a substantially rectangular window opening therein, of an integral metal frame of substantially rectangular shape and having a width measured longitudinally of the body less than the width of said opening, said metal frame being rigidly secured in said opening at the forward end of the latter to divide the opening into a rearward portion and a frame enclosed forward portion, a window supported for sliding movement in the rearward portion of said opening, the rearward portion of said frame being formed to provide guide means for said window, a second window pivoted in said frame for swinging movement about a substantially vertical axis into and out of the plane of the frame, and guide means for said first named window secured to and depending from said frame and affording a continuation of said first named guide means.

14. In a motor vehicle body, the combination with a paneled structure having a substantially rectangular window opening therein, of an integral metal frame of substantially rectangular shape and having a width measured longitudinally of the body less than the width of said opening, said metal frame being rigidly secured in said opening at the forward end of the latter to divide the opening into a rearward portion and a frame enclosed forward portion, a window supported for sliding movement in the rearward portion of said opening, guide means for said window carried by said frame, said guide means including a member secured to and depending from said frame, and a second window pivoted in said frame for swinging movement about a substantially vertical axis into and out of the plane of the frame.

15. In a motor vehicle body, the combination with a paneled structure having a substantially rectangular window opening therein, of an integral metal frame constituting a unit construction for insertion in said opening, said frame including means forming a generally rectangular structure having a width measured longitudinally of the body substantially less than the width of said opening, said frame being rigidly secured in said opening to divide the opening into a rearward portion and a forward portion defined by said rectangular structure, a window supported for sliding movement in the rearward portion of said opening, guide means for said window carried by said frame, and a second window pivoted in and fitting said rectangular structure for swinging movement about a substantially vertical axis into and out of the plane of the frame.

JESSE G. VINCENT.

CERTIFICATE OF CORRECTION.

Patent No. 2,053,854. September 8, 1936.

JESSE G. VINCENT.

It is hereby certified that error appears in the printed specification of the above numbered patent requiring correction as follows: Page 3, first column, lines 41, 42, 51, and 52, claims 3 and 4 respectively, for the word "door" read paneled; line 73, claim 6, for "said" read a; and that the said Letters Patent should be read with these corrections therein that the same may conform to the record of the case in the Patent Office.

Signed and sealed this 15th day of December, A. D. 1936.

(Seal)

Henry Van Arsdale
Acting Commissioner of Patents.